United States Patent Office 3,497,520
Patented Feb. 24, 1970

3,497,520
PROCESS FOR PRODUCING PYRIDOXAL-5-PHOSPHATE
Takeo Naito, Ichikawa-shi, Katsujiro Ueno, Tokyo, Fumiyoshi Ishikawa and Yoshiaki Omura, Funabashi-shi, and Seiichi Miyazaki, Tokyo, Japan, assignors to Daiichi Seiyaku Company, Limited, Tokyo, Japan, a Japanese corporation
No Drawing. Filed June 26, 1967, Ser. No. 649,007
Claims priority, application Japan, July 9, 1966, 41/44,398; Jan. 14, 1967, 42/2,433; Feb. 22, 1967, 42/10,942; Mar. 13, 1967, 42/15,349
Int. Cl. C07d 31/48, 91/16; C07f 9/08
U.S. Cl. 260—294.8
16 Claims

ABSTRACT OF THE DISCLOSURE

Pyridoxal-5-phosphate is obtained by reacting 4-methyl-5-lower alkoxyoxazole with 2,5-di-lower alkoxy-2,5-dihydrofuran to form an adduct, treating the compound with an alkali metal hydroxide to form 1,3-dihydro-1,3-di-lower alkoxy-6-methylfuro[3,4-c]pyridin-7-ol, hydrolyzing the product with an acid to 2-methyl-3-hydroxypyridine-4,5-dicarboxaldehyde, reacting the product with 2-cyclohexylaminoethanethiol or 2-benzylaminoethanethiol to afford 2-(3-hydroxy-5-formyl-2-methyl-4-pyridyl)-3 - cyclohexylthiazolidine or 2-(3-hydroxy-5-formyl-2-methyl - 4 - pyridyl)-3-benzylthiazolidine, respectively, reducing the product to 2 - (3 - hydroxy-5-hydroxymethyl-2-methyl-4-pyridyl)-3-cyclohexylthiazolidine or 2-(3-hdroxy-5-hydroxymethyl-2-methyl-4-pyridyl)-3-benzyl thiazolidine, respectively, phosphorylating the product with a mixture of orthophosphoric acid and phosphorus pentoxide, heating the reaction mixture with the addition of water, and then treating the resultant mixture with an alkali metal hydroxide.

The present invention relates to a novel process for the manufacture of pyridoxal-5-phosphate and also to novel intermediates utilized and/or formed in the above-described process.

Pyridoxal-5-phosphate is a very useful substance as a medicine, and a number of processes have hitherto been known for manufacturing the same, for example, by oxidation or transamination of pyridoxamine-5-phosphate [E. A. Peterson et al., Journal of the American Chemical Society, vol. 76, 169 (1954) and R. F. Long, British Patent No. 749,800] or by phosphorylation of pyridoxal after protection of its aldehyde group and by subsequent removal of the protecting group [P. Karrer et al., Helvetica Chimica Acta, vol. 34, 1834 (1951); G. Schorre, U.S. Patent No. 3,124,587 and Murakami et al., Japanese Patent No. 472,627].

These known processes invariably depend on pyridoxal or pyridoxamine as a starting material. As is known to the art, pyridoxal and pyridoxamine are costly because both are prepared from pyridoxine. Thus, the pyridoxal-5-phosphate prepared by any of the known processes is naturally high-priced.

It is therefore an object of the present invention to provide a process for economically manufacturing pyridoxal-5-phosphate.

Another object of the invention is to provide a process for manufacturing pyridoxal-5-phosphate from inexpensive materials, without using any expensive one such as pyridoxine, pyridoxal or pyridoxamine.

The process of the invention can be expressed by the following reaction scheme:

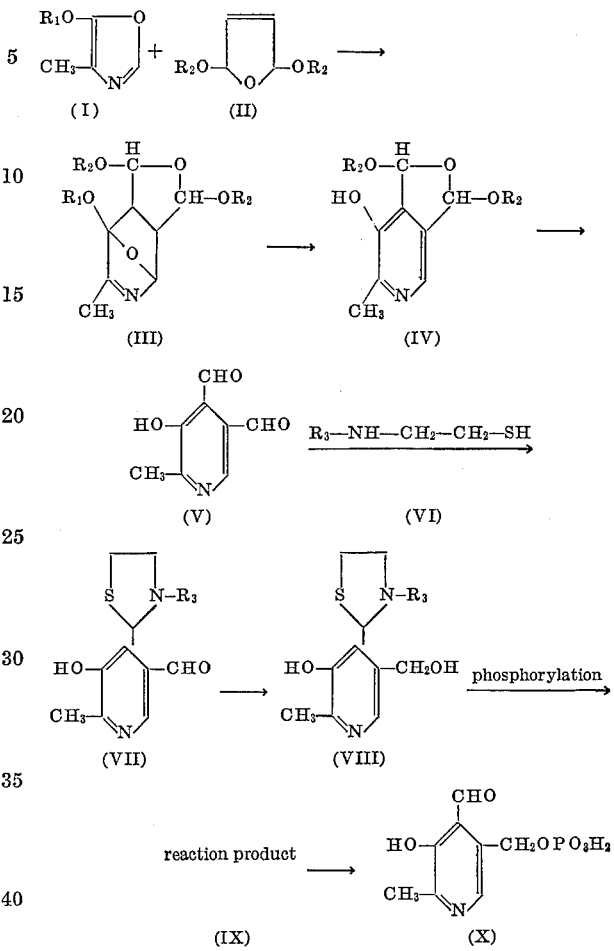

wherein $R_1$ and $R_2$ may be the same or different and represent lower alkyl groups having from one to five carbon atoms and $R_3$ represents a cyclohexyl or benzyl group.

The process of the invention comprises the steps of reacting 4-methyl-5-lower alkoxyoxazole (I) with 2,5-dilower alkoxy-2,5-dihydrofuran (II) to form an adduct (III), treating the adduct with an alkali metal hydroxide to form 1,3-dihydro-1,3-di-lower alkoxy-6-methylfuro[3,4-c]-pyridin-7-ol (IV), hydrolyzing the product with an acid to 2-methyl-3-hydroxypyridine-4,5-dicarboxaldehyde (V), reacting the product with 2-cyclohexylaminoethanethiol or 2-benzylaminoethanethiol (VI) to afford 2-(3-hydroxy-5-formyl-2-methyl-4-pyridyl)-3 - cyclohexylthiazolidine or 2-(3-hydroxy-5-formyl-2-methyl-4-pyridyl)3-benzylthiazolidine (VII), respectively, reducing the product to 2 - (3-hydroxy-5-hydroxymethyl-2-methyl-4-pyridyl)-3-cyclohexylthiazolidine or 2-(3-hydroxy-5-hydroxmethyl-2-methyl-4-pyridyl)-3-benzylthiazolidine (VIII), respective-l, phosphorylating the product with a mixture of orthophosphoric acid and phosphorus pentoxide, heating the reaction mixture with the addition of water, and then treating the mixture with an alkali metal hydroxide, thereby to obtain desired pyridoxal-5-phosphate (X).

As briefly described above, the present inventors have surprisingly discovered the following unexpected facts.

First, the new compound (V) can be synthesized in a good yield in a simple manner starting from the reaction of (I) with (II), although the preparation of a pyridine derivative having two vicinal aldehyde groups has generally been considered troublesome.

Secondly, the reaction of 2-methyl-3-hydroxypyridine-4,5-dicarboxaldehyde (V) with 2-cyclohexylaminoethanethiol or 2-benzylaminoethanethiol (VI) gives exclusively the 4-thiazolidinyl-5-formylpyridine derivative (VII) in a nearly quantitative yield without formation of any by-product, and this selective reaction takes place only with 2-cyclohexylaminoethanethiol and 2-benzylaminoethanethiol among various aminoethanethiol derivatives investigated. For example, the reaction of (V) with aminoethanethiol gives no thiazolidine derivative but a resinous product. Also, the reaction of (V) with 2-methylaminoethanethiol affords a considerable amount of by-product (mainly the 4,5-dithiazolidinylpyridine derivative) in addition to the 4-thiazolidinyl-5-formylpyridine derivative. Further, in the reaction of (V) with 2-phenylaminoethanethiol, the 4-thiazolidinyl-5-formylpyridine derivative is obtained in only about 20 percent yield. Thus, the use of either 2-cyclohexylaminoethanethiol or 2-benzylaminoethanethiol brings about an unexpectedly high yield of formation of the 4-thiazolidinyl-5-formylpyridine derivative (VII) and makes the present invention to be an advantageous method for the production of pyridoxal-5-phosphate.

Thirdly, the aldehyde group at the 5-position of a compound of the Formula VII is readily reduced to give a compound of the Formula VIII in an excellent yield.

The present invention has been completed on the basis of the above findings. According to the process of the invention, pyridoxal-5-phosphate is advantageously manufactured via novel intermediates of the Formulas III, IV, V, VII and VIII.

One of the starting materials for the process of the invention is a compound of the Formula I wherein $R_1$ is a straight- or branched-chain lower alkyl group such as methyl, ethyl, propyl, isopropyl, or butyl group and is readily prepared according to the method described by Harris et al. in Journal of Organic Chemistry, vol. 27, 2705 (1962). The other starting material for the process of the present invention is a compound of the Formula II wherein $R_2$ is a straight- or branched-chain lower alkyl group such as methyl, ethyl, propyl, isopropyl, or butyl group, and can easily be obtained according to the method described by Clauson-Kaas et al. in Acta Chemica Scandinavica, vol. 6, 531 (1952) or by Hufford et al. in Journal of the American Chemical Society, vol. 74, 3014 (1952). The compound of the Formula II prepared by the above methaods is a mixture of cis and trans stereoisomers, both of which may be isolated by distillation. In the process of the present invention either cis or trans isomer can be used, although the cis isomer has been proved to take part in the reaction with (I) more easily than the trans isomer. In the process of the present invention, (II) is advantageously used as a mixture of cis and trans isomers, and the products (III) and (IV) obtained in the subsequent steps may be a mixture of cis and trans isomers with respect to the two alkoxy groups. It is to be noted that the process of the present invention can be carried out without respect to the stereoisomerism mentioned above.

The reaction of (I) with (II) for the production of (III) proceeds at room temperature but is preferably carried out at a temperature between 50 and 200° C., especially between 100 and 150° C. The use of solvent is not essential, but a conventional organic solvent such as ethanol, benzene, toluene or xylene may be employed. In the reaction, a small amount of hydroquinone can be effectively added to prevent side reactiions such as polymerization. It is also desirable to carry out the reaction in an atmosphere of inert gas such as nitrogen or argon. It is possible to carry out the reaction using one mole of (II) per mole of (I), but it is generally preferable to use (II) in excess, for example, 3 to 15 moles per mole of (I). Thus, (III) can be obtained in a good yield by reacting (I) with (II) at a temperature between 100 and 150° C. for a period of one to 15 hours.

Concentration in vacuo of the reaction mixture thus obtained gives an adduct of the Formula III as a residue, and a mixture of the unreacted starting materials (I) and (II) is recovered as a distillate. The residue may contain theoretically eight kinds of stereoisomers with respect to the endo-exo adductation and the cis-trans isomerism of dialkoxy groups on the tetrahydrofuran ring. In the case in which $R_1$ is an ethyl group and $R_2$ is a methyl group, recrystallization of the residue from ligroin affords a compound of melting point 113° C. and purification of the mother liquor by alumina chromatography followed by recrystallization from petroleum benzine gives another compound of melting point 75° C. On the basis of elemental analysis and spectral data, it is assumed that the former compound is an endo-adduct and the latter an exo-adduct and that both compounds have cis dimethoxy groups corresponding to the Formula III. In practicing the process of the invention, however, it is not necessary to isolate these crystalline substances, but the crude product obtained above by concentrating the reaction mixture may be used in the next step.

The unreacted starting materials (I) and (II) are efficiently recovered as a distillate by concentration of the reaction mixture and can be re-used after complementary additon of (I) and (II). Accordingly, by repeating the above procedure, the adduct (III) can be obtained in a high yield.

The adduct (III), when treated with an alkali metal hydroxide such as sodium hydroxide or potassium hydroxide, can readily be converted to a compound of the Formula IV. The reaction is smoothly effected in a suitable solvent such as water, methanol, ethanol, dioxane or a mixture thereof at a temperature between room temperature and 100° C. It is particularly desirable to treat (III) with sodium or potassium hydroxide in a lower aliphatic alcohol such as methanol or ethanol at a temperature between 60 and 80° C. By this procedure, (IV) is obtained in a substantially quantiative yield. In the where $R_2$ is a methyl group, recrystallization of the crude product from methanol affords a compound of melting point 165–166° C. corresponding to the Formula IV which has been shown by NMR (nuclear magnetic resonance) spectral analysis to have cis-dimethoxy groups on the dihydrofuran ring.

Next, (IV) is hydrolyzed with an acid such as hydrochloric acid, sulfuric acid, or acetic acid in water, or in a mixture of water and an organic solvent miscible with water such as methanol, ethanol or dioxane at a temperature between room temperature and 100° C. In this way, a compound of the Formula V is quantitatively formed, but the product is in general isolated as a cyclic monohydrate of (V), that is, 1,3-dihydro-1,3-dihydroxy-6-methylfuro 3, 4-c pyridin-7-ol which is shown by the following formula:

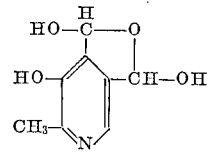

The NMR spectral analysis shows the existence of an equilibrium between the dialdehyde structure (V) and its cyclic monohydrate In practicing the process of the invention, however, isolation of the product is not necessary and the reaction mixture obtained by hydrolysis can conveniently be employed in the subsequent step.

The reaction of (V) with (VI) is carried out in a solvent such as water, an organic solvent, e.g., methanol, ethanol, or dioxane or a mixture thereof at a temperature between room temperature and 100° C. Both compounds (V) and (VI) may be used as either free bases or acid salts and are conveniently employed in substantially equimolar amounts. In the case where free bases of (V) and (VI) are used, the reaction proceeds smoothly at a temperature between room temperature and 100° C. When either or both of (V) and (VI) are used as acid salts, they are liberated by neutralization with an alkali metal hydroxide, carbonate or hydrogen carbonate before or after the two are brought into contact with each other. In this way, the compound (VII) is formed in an excellent yield and can be isolated in a pure state. In the practice of the process of the invention, however, the compound (VII), without being isolated, can advantageously be subjected to the next reaction.

In the reduction of (VII) to (VIII), conventional methods can be employed. For example, the reduction of (VII) with sodium borohydride, aluminum isopropoxide in isopropanol or zinc powder in an aqueous acetic acid affords (VIII) in an excellent yield.

In the final phosphorylation step, a mixture of orthophosphoric acid and phosphorus pentoxide is used as a phosphorylating agent. The reagent was described by R. E. Ferrell et al. in Journal of the American Chemical Society, vol. 70, 2101 (1948). Thus, the compound (VIII) is easily phosphorylated when heated with stirring with this reagent at a temperature between 40 and 80° C. for one to 10 hours. The product (IX) resulting from the phosphorylation is presumed to be a compound which may be expressed by the following formula:

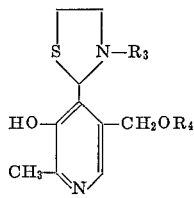

wherein $R_4$ represents a polyphosphoric acid group and $R_3$ represents the same as defined above. The resultant product (IX), without being isolated, is converted to (X) by hydrolysis of both the polyphosphoric acid group and the thiazolidine ring. The reaction is carried out by heating the reaction mixture with the addition of water to first convert the polyphosphoric acid group to a monophosphoric acid group and subsequent treatment with an alkali metal hydroxide to then hydrolyze the thiazolidine ring. Thus, the above-mentioned phosphorylation mixture is heated with the addition of water at a temperature between 90 and 100° C. for 30 minutes to one hour, and then is treated at room temperature with an alkali metal hydroxide such as sodium or potassium hydroxide to adjust the pH of the solution to 10 or more.

For the isolation of the final product (X), the solution resulting from the above hydrolysis can be purified using, for example, active carbon or an ion-exchange resin such as Amberlite CG-50 or Amberlite IR-120 (trademarks of Rhom & Haas Co.). In the process of the invention, however, a preferably procedure is to add an organic base such as 4-aminoantipyrine, α-naphthylamine or β-naphthylamine to the solution resulting from the above hydrolysis, neutralize the solution with an acid such as hydrochloric or acetic acid to precipitate the product (X) as a Schiff base, isolate the Schiff base, decompose it with an aqueous solution of an alkali metal hydroxide such as sodium or potassium hydroxide, remove the liberated organic base from the solution, treat the solution with an ion-exchange resin or neutralize with an acid, and then evaporate the resultant solution, thus affording pyridoxal-5-phosphate of high purity in a good yield.

The following examples are given by way of illustration only and are not to be construed as limiting.

EXAMPLE 1

A mixture of 5 g. of 4-methyl-5-ethoxyoxazole and 50 g. of 2,5-dimethoxy-2,5-dihydrofuran was heated at 120–130° C. under nitrogen in a sealed tube for 8 hours. The reaction mixture was distilled under reduced pressure, 47 g. of a mixture of the unreacted 4-methyl-5-ethoxyoxazole and 2,5-dimethoxy-2,5-dihydrofuran was recovered as a distillate and 7.0 g. of a crude adduct was obtained as a half-crystalline residue. Part of the residue was dissolved in benzene, passed through a column of alumina and, after evaporation of the solvent, recrystallized from ligroin to give colorless crystals of the endo-adduct (III), M.P. 113° C.

*Analysis.*—Calcd. for $C_{12}H_{19}O_5N$ (percent): C, 56.02; H, 7.44; N, 5.44. Found (percent): C, 56.04; H, 7.54; N, 5.5.

The mother liquor obtained by separation of the endo-adduct was evaporated, the residue in petroleum benzine was chromatographed on alumina and eluted with petroleum benzine with increasing amount of benzene. From the petroleum benzine-benzene (9:1 and 1:1) eluate another product of M.P. 7° C. was obtained after recrystallization from petroleum benzine, which corresponds to an exo-adduct (III).

*Analysis.*—Calcd. for $C_{12}H_{19}O_5N$ (percent): C, 56.02; H, 7.44; N, 5.44. Found (percent): C, 55.65; H, 7.46; N, 5.2.

Three grams of adduct, M.P. 113° C., obtained above was heated under reflux in 60 ml. of a 5% potassium hydroxide methanol solution for 6 hours. The reaction mixture was neutralized with concentrated hydrochloric acid and an inorganic precipitate was separated by filtration. The filtrate was concentrated to give a crystalline residue, which was extracted with chloroform. Evaporation of the extract afforded 2.3 g. of 1,3-dihydro-1,3-dimethoxy-6-methylfuro[3,4-c]pyridin-7-ol. A pure sample of M.P. 165°–166° C. was obtained by recrystallization from methanol.

*Analysis.*—Calcd. for $C_{10}H_{13}O_4N$ (percent): C, 56.86; H, 6.20; N, 6.63. Found (percent): C, 57.21; H, 6.17; N, 6.74.

In the same manner as described for the adduct of M.P. 113° C., the adduct of M.P. 75° C. obtained above was treated with a potassium hydroxide methanol solution to give the same compound, 1,3-dihydro-1,3-dimethoxy-6-methylfuro[3,4-c]pyridin-7-ol, M.P. 165° C.

A solution of 0.42 g. of 1,3-dihydro-1,3-dimethoxy-6-methylfuro-[3,4-c]pyridin-7-ol obtained above in 5 ml. of 10% hydrochloric acid was heated at 100° C. for 10 minutes. The reaction mixture was concentrated at a low temperature under reduced pressure to give a colorless crystalline residue of 2-methyl-3-hydroxypyridine-4,5-dicarboxaldehyde monohydrate hydrochloride, i.e., 1,3-dihydro-1,3-dihydroxy-6-methylfuro[3,4-c]pyridin-7-ol hydrochloride, which exhibited no definite melting point. Ultraviolet absorption maximum: 288mμ in normal hydrochloric acid.

*Analysis.*—Calcd. for $C_8H_9O_4N \cdot HCl$: C, 43.74; H, 4.59; N, 6.38; Cl, 16.14. Found: C, 43.98; H, 4.62; N, 6.37; Cl, 16.48%.

0.5 g. of 2-methyl-3-hydroxypyridine-4,5-dicarboxaldehyde monohydrate hydrochloride obtained above was dissolved in minimum amount of water, neutralized with ice-cooling to pH 7 using a normal sodium hydroxide solution and the precipitate was separated by centrifuge, washed with cold water. The product was recrystallized from a small amount of water and dried under reduced pressure at a temperature lower than 50° C. to afford a white crystalline solid which corresponds to 1,3-dihydro-1,3-dihydroxy-6-methylfuro[3,4-c]pyridin-7-ol having 1.5 mols of water of crystallization. It had no clear melting point.

*Analysis.*—Calcd. for $C_8H_9O_4N \cdot 1.5H_2O$: C, 45.71; H, 5.75; N, 6.66. Found: C, 45.16; H, 5.23; N, 6.29%.

0.46 g. of 2-methyl-3-hydroxypyridine-4,5-dicarboxaldehyde monohydrate hydrochloride obtained above was dissolved in 6 ml. of water and to this solution was added 0.32 g. of 2-cyclohexylaminoethanthiol in 3 ml. of 1 N hydrochloric acid. The solution was heated to 40–50° C. and adjusted to pH 7–8 with a concentrated sodium hydroxide solution. An oily material was separated and extracted with chloroform. The extract was dried over anhydrous sodium sulphate and evaporated to give a crystalline residue. Recrystallization of the residue from acetone afforded 2-(3-hydroxy-5-formyl-2-methyl-4-pyridyl)-3-cyclohexylthiazolidine, M.P. 107–109° C.

*Analysis.*— Calcd. for $C_{16}H_{22}O_2N_2S$: C, 62.71; H, 7.24; N, 9.14; S, 10.46. Found: C, 62.60; H, 7.22; N, 8.90; S, 10.17%.

A solution of 0.42 g. of 2-(3-hydroxy-5-formyl-2-methyl-4-pyridyl)-3-cyclohexylthiazolidine obtained above in aqueous methanol was treated with 0.07 g. of sodium borohydride and allowed to stand at room temperature for one hour. Evaporation of methanol from the reaction mixture quantitatively precipitated 2-(3-hydroxy-5-hydroxymethyl - 2-methyl - 4-pyridyl) - 3 - cyclohexylthiazolidine, which showed M.P. 198–200° C. Recrystallization from acetone raised the M.P. to 199–200.5° C.

*Analysis.*—Calcd. for $C_{16}H_{24}O_2N_2S$: C, 62.30; H, 7.84; N, 9.08; S, 10.40. Found: C, 62.69; H, 8.04; N, 8.90; S, 10.26%.

0.62 g. of 2-(3-hydroxy-5-hydroxymethyl-2-methyl-4-pyridyl)-3-cyclohexylthiasolidine thus obtained was added to a mixture of 3.0 g. of 85% orthophosphoric acid and 2.5 g. of phosphorus pentoxide and the mixture was heated with stirring at 60° C. for 5 hours. After cooling, the reaction mixture was treated with 20 ml. of water and heated at 100° C. for 30 minutes. The solution was cooled to room temperature and added with 3.0 g. of active carbon to adsorb the product. The active carbon was thoroughly washed with water and eluted with 200 ml. of 1 N sodium hydroxide. The eluate was concentrated to a small volume under reduced pressure, poured onto a column (3.2 x 60 cm.) of acidic ion-exchange resin, Amberlite CG–50, and eluted with water. Fractions containing pyridoxal-5-phosphate were collected, concentrated to a small volume at a low temperature under reduced pressure and allowed to stand in a refrigerator. White crystals precipitated were collected by filtration to give 0.32 g. of pyridoxal-5-phosphate monohydrate, which was identical in all respects with an authentic sample of pyridoxal-5-phosphate monohydrate.

EXAMPLE 2

A solution of 2.6 g. of 4-methyl-5-ethoxyoxazole and 26 g. of 2,5-dimethoxy-2,5-dihydrofuran was heated at 100° C. for 20 hours under nitrogen in a sealed tube. The reaction mixture was concentrated under reduced pressure to give 3.0 g. of an adduct as a residue and a mixture of the unreacted 4-methyl-5-ethoxyoxazole and 2,5-dimethoxy-2,5-dihydrofuran as a distillate. The adduct was disolved in 60 ml. of a 5% potassium hydroxide methanol solution and the solution was heated under reflux for 40 hours. After cooling, the reaction mixture was neutralized with concentrated hydrochloric acid to separate inorganic material, which was filtered off. The filtrate was evaporated to give a crystalline residue, which was extracted with chloroform. The extract was concentrated to afford 1.96 g. of 1,3-dihydro-1,3-dimethoxy-6-methylfuro[3,4-c]pyridin-7-ol.

2.8 g. of 1,3-dihydro-1,3-dimethoxy-6-methylfuro[3,4-c]-pyridin-7-ol thus obtained was dissolved in 40 ml. of 10% hydrochloric acid and the solution was heated at 100° C. for 10 minutes. The solution was cooled, adjusted to pH 7–8 with a concentrated sodium hydroxide solution, added with 80 ml. of methanol and the mixture was heated to 40–50° C., added with 2.22 g. of 2-cyclohexylaminoethanethiol in 10 ml. of methanol, maintained at this temperature for 30 minutes. Then, the mixture was cooled to room temperature, treated with 0.25 g. of sodium borohydride and allowed to stand at room temperature for one hour. Evaporation of methanol from the reaction mixture gave a precipitate, which was filtered to give 3.38 g. of 2-(3-hydroxy-5-hydroxymethyl-2-methyl-4-pyridyl)-3-cyclohexylthiazolidine, M.P. 199–200° C.

0.62 g. of 2-(3-hydroxy-5-hydroxymethyl-2-methyl-4-pyridyl)-3-cyclohexylthiazolidine obtained above was agitated with a mixture of 3.0 g. of 85% orthophosphoric acid and 2.5 g. of phosphorus pentoxide at 50° C. for 3 hours. 20 ml. of water was added to the reaction mixture and the solution was heated at 100° C. for 30 minutes, cooled, and made alkaline with the addition of 8 g. of sodium hydroxide in 40 ml. of water. The solution was treated with 0.40 g. of 4-amino-antipyrine and the pH of the solution was adjusted to 3 with concentrated hydrochloric acid, and then the mixture was allowed to stand overnight in a refrigerator. The separated Schiff base was collected by filtration, washed with water, dissolved in 10 ml. of 2 N sodium hydroxide, and extracted with benzene to remove 4-amino-antipyrine formed. The aqueous layer was neutralized with hydrochloric acid, concentrated to a small volume under reduced pressure at a low temperature and allowed to stand overnight in a refrigerator. The separated crystals were collected by filtration to give 0.28 g. of pyridoxal-5-phosphate monohydrate.

EXAMPLE 3

A solution of 2.54 g. of 4-methyl-5-ethoxyoxazole and 26 g. of 2,5-dimethoxy-2,5-dihydrofuran was heated at 130° C. for 4 hours under nitrogen in a sealed tube. The reaction mixture was concentrated under reduced pressure to give an adduct as a residue and a mixture of the unreacted 4-methyl-5-ethoxyoxazole and 2,5-dimethoxy-2,5-dihydrofuran was recovered as a distillate. To the distillate which contains about 50% of 4-methyl-5-ethoxyoxazole used was added 1.27 g. of 4-methyl-5-ethoxyoxazole and the solution was adjusted to the original molar ratio by addition of appropriate amount of 2,5-dimethoxy-2,5-dihydrofuran and again heated at 130° C. for 4 hours under nitrogen in a sealed tube. This reaction procedure was repeated ten times, giving 24.5 g. of an adduct, The product was dissolved in 500 ml. of a 5% potassium hydroxide methanol solution and the mixture was heated under reflux for 5 hours. After cooling, the reaction mixture was neutralized with concentrated hydrochloric acid, the precipitated inorganic material was separated by filtration and the filtrate was concentrated under reduced pressure to give 1,3-dihydro-1,3-dimethoxy-6-methylfuro[3,4-c]pyridin-7-ol as a crystalline mass.

The product obtained above was dissolved in 250 ml. of 10% hydrochloric acid and the solution was heated at 100° C. for 10 minutes, neutralized with ice-cooling to pH 7–8 with a concentrated sodium hydroxide solution, added with 300 ml. of methanol, heated again to 40–50° C., treated with a solution of 14.5 g. of 2-cyclohexylaminoethanethiol in 20 ml. of methanol and maintained at this temperature for 30 minutes. To this mixture was added 1.70 g. of sodium borohydride at room temperature and the solution was agitated for one hour. Evaporation of methanol from the reaction mixture afforded a precipitate, which was separated by filtration to give 23.1 g. of 2-(3-hydroxy-5-hydroxymethyl-2-methyl-4-pyridyl)-3-cyclohexylthiazolidine, M.P. 196–198° C.

0.62 g. of 2-(3-hydroxy-5-hydroxymethyl-2-methyl-4-pyridyl)-3-cyclohexylthiazolidine obtained above was agitated with a mixture of 3.0 g. of 85% orthophosphoric acid and 2.5 g. of phosphorus pentoxide at 50° C. for 5 hours and the solution was treated with 20 ml. of water, heated at 100° C. for 30 minutes. The reaction mixture was poured into a solution of 8 g. of sodium hydroxide in 40 ml. of water to be rendered alkaline, treated with 0.40 g. of 4-aminoantipyrine, adjusted to pH 3 with hydrochloric acid and allowed to stand overnight in a refrigerator. The precipitated Schiff base was separated by filtration, washed with water and dissolved in 10 ml. of 2 N sodium hydroxide. The mixture was extracted with benzene to remove 4-aminoantipyrine formed and the aqueous layer was poured onto a column of an ion-exchange resin, Amberlite CG–50, and eluted with water. Fractions containing pyridoxal-5-phosphate were collected, concentrated to a small volume under reduced pressure at a low temperature and allowed to stand overnight in a refrigerator. The precipitate was filtered to give 0.37 g. of pyridoxal-5-phosphate monohydrate.

EXAMPLE 4

A mixture of 0.64 g. of 4-methyl-5-ethoxyoxazole, 6.5 g. of 2,5-dimethoxy-2,5-dihydrofuran and 20 mg. of hydroquinone in 10 ml. of benzene was heated under reflux for 40 hours. Concentration of the reaction mixture gave 0.60 g. of an adduct as a half-crystalline residue. The residue was treated in the same manner as in Example 1 to give 1,3 - dihydro-1,3 - dimethoxy - 6 - methylfuro [3,4-c]pyridin-7-ol.

0.42 g. of 1,3-dihydro-1,3-dimethoxy-6-methylfuro[3,4-c]-pyridine-7-ol obtained was dissolved in 5 ml. of 10% hydrochloric acid and heated at 100° C. for 10 minutes. The reaction mixture was cooled, adjusted to pH 7–8 with a concentrated sodium hydroxide solution, added with 0.32 g. of 2-cyclohexylaminoethanethiol and heated at 50–60° C. for 10 minutes. The separated oil was extracted with chloroform and the extract was dried over anhydrous sodium sulphate and evaporated to give 2-(3-hydroxy - 5 - formyl - 2 - methyl - 4 pyridyl) - 3 - cyclohexylthiazolidine as a crystalline residue. The product was dissolved in 50 ml. of isopropanol and heated under reflux for 24 hours with 0.61 g. of aluminum isopropoxide. The residue obtained by evaporation of the solvent was treated with water and the mixture was acidified to pH 2 with hydrochloric acid and then neutralized to pH 7 with a sodium carbonate solution. The mixture was extracted with chloroform and the extract after drying over anhydrous sodium sulphate was evaporated to afford 0.41 g. of 2-(3-hydroxy-5-hydroxymethyl-2-methyl-4-pyridyl)-3-cyclohexylthiazolidine as a crystalline residue, M.P. 199–200° C.

In the same manner as described in Example 3, 0.62 g. of 2-(3-hydroxy-5-hydroxymethyl-2-methyl-4-pyridyl)-3-cyclohexylthiazolidine obtained above was phosphorylated and hydrolyzed to give 0.37 g. of pyridoxal-5-phosphate monohydrate.

EXAMPLE 5

A mixture of 2.6 g. of 4-methyl-5-ethoxyoxazole and 37 g. of 2,5-diisopropoxy-2,5-dihydrofuran was heated at 100° C. for 20 hours under nitrogen in a sealed tube. The reaction mixture was concentrated under reduced pressure to give a crude adduct as a residue and a mixture of the unreacted 4-methyl-5-ethoxyoxazole and 2,5-diisopropoxy-2,5-dihydrofuran was recovered. The adduct was dissolved in a 5% potassium hydroxide methanol solution and the mixture was heated under reflux for 5 hours. After cooling, the reaction mixture was neutralized with a concentrated hydrochloric acid to separate an inorganic material, which was filtered off. The filtrate was concentrated to dryness in vacuo and the residue was extracted with chloroform. The extract was evaporated to give 1.25 g. of 1,3-dihydro-1,3-diisopropoxy-6-methylfuro [3,4-c]pyridin-7-ol which, after recrystallization from acetone, showed M.P. 153–154° C.

*Analysis.*—Calcd. for $C_{14}H_{21}O_4N$: C, 62.90; H, 7.92; N, 5.24. Found: C, 62.64; H, 7.85; N, 5.29 percent.

0.50 g. of 1,3-dihydro-1,3-diisopropoxy-6-methyl-furo [3,4-c]-pyridin-7-ol obtained above was dissolved in 6 ml. of 10% hydrochloric acid and the solution was heated at 100° C. for 10 minutes. The reaction mixture was concentrated to dryness under reduced pressure to give 2-methyl-3-hydroxypyridine-4,5-dicarboxaldehyde monohydrate hydrochloride as a colorless crystalline residue.

In the same manner as described in Example 1, 2-methyl-3-hydroxypyridine-4,5-dicarboxaldehyde monohydrate hydrochloride obtained above was treated to give pyridoxal-5-phosphate monohydrate.

EXAMPLE 6

In the same manner as described in Example 1, 1,3-dihydro-1,3-dimethoxy-6-methylfuro[3,4-c]pyridin-7-ol was prepared. 0.42 g. of the above-obtained product was dissolved in 5 ml. of 10% hydrochloric acid and heated at 100° C. for 10 minutes. The reaction mixture was cooled, adjusted to pH 7–8 with a sodium hydroxide solution and warmed at 50–60° C. for 10 minutes after addition of 0.32 g. of 2-cyclohexylaminoethanethiol. To the cooled reaction mixture were added 3 ml. of glacial acetic acid and 0.15 g. of zinc powder and the mixture was agitated at 5–10° C. for one hour. The reaction mixture was evaporated to dryness under reduced pressure and the residue was treated with water and extracted with chloroform. The chloroform extract after washing and drying over anhydrous sodium sulphate was evaporated to afford a residue, which was recrystallized from acetone to give 0.20 g. of 2-(3-hydroxy-5-hydroxymethyl-2-methyl-4-pyridyl)-3-cyclohexylthiazolidine.

0.62 g. of 2-(3-hydroxy-5-hydroxymethyl-2-methyl-4-pyridyl)-3-cyclohexylthiazolidine obtained above was agitated at 50° C. for 5 hours with a mixture of 3.0 g. of 85% orthophosphoric acid and 2.5 g. of phosphorus pentoxide. 20 ml. of water was added with cooling to the reaction mixture and the solution was heated at 100° C. for 30 minutes, cooled and made alkaline by addition of 8 g. of sodium hydroxide in 40 ml. of water. 0.29 g. of α-napthylamine was added to the solution, the pH of the solution was brought to 3 with hydrochloric acid and the mixture was allowed to stand overnight in a refrigerator to give a Schiff base as a precipitate. The precipitate was worked up in the same way as in Example 3 to give 0.37 g. of pyridoxal-5-phosphate monohydrate.

EXAMPLE 7

In the same manner as described in Example 1, 2-(3-hydroxy-5-hydroxymethyl - 2 - methyl-4-pyridyl)-3-cyclohexylthiazolidine was prepared. 0.62 g. of the above-obtained product was agitated at 60° C. for 3 hours with a mixture of 3.0 g. of 85% orthophosphoric acid and 2.5 g. of phosphorous pentoxide. The mixture was cooled, added with 10 ml. of water and rendered alkaline by treatment with 8 g. of sodium hydroxide in 40 ml. of water. The solution was poured onto a column (3.2 x 11 cm.) of Amberlite CG–50 and eluted with water. The eluate was added with an appropriate amount of concentrated hydrochloric acid to make the solution have one normal hydrochloric acid concentration, heated at 80° C. for 30 minutes and then treated with 3 g. of active carbon. The active carbon was thoroughly washed with water and eluted with 300 ml. of 1.5% ammoniacal water. The elute was concentrated to a small volume under reduced pressure, poured onto a column (3.2 x 60 cm.) of Amberlite CG–50 and eluted with water. Fractions containing pyridoxal-5-phosphate were collected, concentrated to a small volume at a low temperature under reduced pressure and allowed to stand overnight in a refrigerator. The separated crystalline power was filtered to give 0.36 g. of pyridoxal-5-phosphate monohydrate.

EXAMPLE 8

In the same manner as described in Example 1, 1,3-dihydro-,1,3 - dimethoxy-6-methylfuro[3,4-c]pyridin-7-ol was prepared. 2.11 g. of the above-obtained product was dissolved in 30 ml. of 10% hydrochloric acid and the solution was heated at 100° C. for 10 minutes, cooled and adjusted to pH 8 with a sodium hydroxide solution. After addition of 50 ml. of methanol, the mixture was heated to 50° C., treated with 1.67 g. of 2-benzylaminoethanethiol and stirred for 30 minutes at this temperature. Evaporation of methanol from the reaction mixture separated an oily material, which was extracted with chloroform. The extract was passed through a column of small amount of alumina and evaporated to dryness to give a crystalline solid. The product was recrystallized from ethyl acetate to yield 2.4 g. of 2-(3-hydroxy-5-formyl-2-methyl - 4-pyridyl) - 3 - benzylthiazolidine, M.P. 119.5–120.5° C.

Analysis.—Calcd. for $C_{17}H_{18}O_2N_2S$: C, 64.94; H, 5.77; N, 8.91; S, 10.20. Found: C, 64.73; H, 6.01; N, 8.76; S, 10.16%.

To a solution of 0.31 g. of 2-(3-hydroxy-5-formyl-2-methyl-4-pyridyl)-3-benzylthiazolidine obtained above in 20 ml. of 50% aqueous methanol was added 0.07 g. of sodium borohydride and the mixture was allowed to stand at room temperature for one hour. Evaporation of methanol from the reaction mixture afforded in quantitative yield 2-(3-hydroxy-5-hydroxymethyl-2-methyl-4-pyridyl)-3-benzylthiazolidine as a crystalline precipitate of M.P. 170–172° C. A pure sample was obtained by recrystallization from acetone, M.P. 171–172° C.

Analysis.—Calcd. for $C_{17}H_{20}O_2N_2S$: C, 64.53; H, 6.37; N, 8.85; S, 10.13. Found: C, 64.58; H, 6.27; N. 9.18; S, 9.91%.

0.63 g. of 2-(3-hydroxy-5-hydroxymethyl-2-methyl-4-pyridyl)-3-benzylthiazolidine obtained above was heated with stirring at 50° C. for 4 hours with a mixture of 3.0 g. of 85% orthophosphoric acid and 2.5 g. of phosphorus pentoxide. 20 ml. of water was added to the reaction mixture and the solution was heated at 100° C. for 40 minutes, cooled and treated with 3.0 g. of active carbon. The carbon was thoroughly washed with water and the product was eluted with 200 ml. of 1 N sodium hydroxide. The eluate was concentrated to a small volume under reduced pressure, poured onto a column (3.2 x 60 cm.) of Amberlite CG–50 and eluted with water. Fractions containing pyridoxal-5-phosphate were collected, concentrated to a small volume at a low temperature under reduced pressure and allowed to stand overnight in a refrigerator. The separated crystals were collected to give 0.31 g. of pyridoxal-5-phosphate monohydrate. The product was identical with an authentic sample of pyridoxal-5-phosphate monohydrate.

EXAMPLE 9

In the same manner as described in Example 1, 1,3-dihydro- 1,3 - dimethoxy-6-methylfuro[3,4-c]pyridin-7-ol was prepared. 2.11 g. of the above-obtained product was dissolved in 30 ml. of 10% hydrochloric acid and the solution was heated at 100° C. for 10 minutes, cooled and adjusted to pH 8 with a sodium hydroxide solution. After addition of 50 ml. of methanol, the mixture was heated to 40–50° C., treated with 1.70 g. of 2-benzylamineoethane-thiol and stirred for 30 minutes at this temperature. After cooling, 0.19 g. of sodium borohydride was added and the mixture was allowed to stand at room temperature for 30 minutes. Evaporation of methanol from the reaction mixture afforded a crystalline precipitate, which was filtered and washed with acetone to give 2.4 g. of 2-(3-hydroxy - 5 - hydroxymethyl-2-methyl-4-pyridyl)-3-benzylthiazolidine, M.P. 168–170° C.

In the same manner as described in Example 8, 2-(3-droxy-5-hydroxymethyl-2-methyl-4 - pyridyl)-3-benzylthi-azolidine obtained above was phosphorylated to afford pyridoxal-5-phosphate monohydrate.

EXAMPLE 10

In the same manner as described in Example 8, 2-(3-hydroxy-5-hydroxymethyl-2-methyl - 4 - pyridyl)-3-benzylthiazolidine was prepared. 0.63 g. of the above-obtained product was agitated with a mixture of 3.0 g. of 85% orthophosphoric acid and 2.5 g. of phospohorus pentoxide at 50° C. for 3 hours. 20 ml. of water was added to the reaction mixture and the solution was heated at 100° C. for 30 minutes, cooled and made alkaline by addition of 8 g. of sodium hydroxide in 40 ml. of water. Then, the mixture was treated with 0.40 g. of 4-aminoantipyrine, adjusted to pH 3 with hydrochloric acid and allowed to stand overnight in a refrigerator. The separated Schiff base was collected by filtration, washed with water and dissolved in 19 ml. of 2 N sodium hydroxide. The mixture was extracted with benzene to remove 4-aminoantipyrine formed and the aqueous layer was neutralized with hydrochloric acid, concentrated to a small volume at a low temperature under reduced pressure and allowed to stand overnight in a refrigerator. Separated crystals were filtered to give 0.27 g. of pyridoxal-5-phosphate monohydrate.

EXAMPLE 11

In the same manner as described in Example 8, 2-(3-hydroxy-5-hydroxymethyl - 2-methyl-4-pyridyl)-3-benzylthiazolidine was prepared. 0.63 g. of the above-obtained product was heated with stirring with a mixture of 3.0 g. of 85% orthophosphoric acid and 2.5 g. of phosphorus pentoxide at 60° C. for 3 hours. 20 ml. of water was added to the reaction mixture and the solution was heated at 100° C. for 30 minutes, cooled and made alkaline by addition of 8 g. of sodium hydroxide in 40 ml. of water. Then, the mixture was treated with 0.29 g. of α-naphthylamine, adjusted to pH 3 with hydrochloric acid and allowed to stand overnight in a refrigerator. The separated Schiff base was collected by filtration, washed with water and dissolved in 10 ml. of 2 N sodium hydroxide. The mixture was extracted with benzene to remove α-naphthylamine formed and the aqueous layer was poured onto a column (3.2 x 60 cm.) of Amberlite CG–50 and eluted with water. Fractions containing pyridoxal-5-phosphate were collected, concentrated to a small volume at a low temperature under reduced pressure and allowed to stand overnight in a refrigerator. Separated crystals were collected by filtration to give 0.35 g. of pyridoxal-5-phosphate monohydrate.

What is claimed is:

1. A process for the manufacture of pyridoxal-5-phosphate which comprises reacting 4-methyl-5-lower alkoxy-oxazole of the general formula:

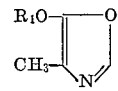

wherein $R_1$ represents a lower alkyl group having from one to five carbon atoms, with 2,5-di-lower alkoxy-2,5-dihydrofuran of the general formula:

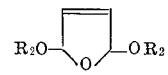

wherein $R_2$ represents a lower alkyl group having from one to five carbon atoms, to produce an adduct; treating the adduct with an alkali metal hydroxide to give 1,3-dihydro-1,3-di-lower alkoxy-6-methylfuro[3,4-c]-pyridin-7-ol of the general formla:

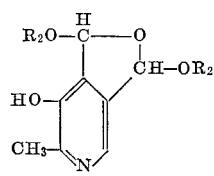

wherein $R_2$ represents the same as defined above; hydrolyzing the product with an acid to 2-methyl-3-hydroxy-pyridine-4,5-dicarboxaldehyde; reacting the product with a compound of the general formula:

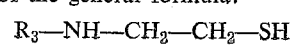

wherein R₃ represents a member selected from the group consisting of cyclohexyl and benzyl, to afford the corresponding compound of the general formula:

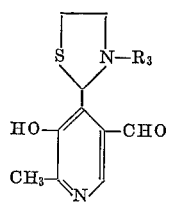

wherein R₃ represents the same as defined above; reducing the product to the corresponding compound of the general formula:

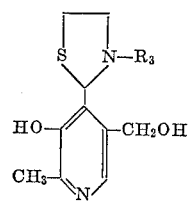

wherein R₃ represents the same as defined above; phosphorylating the compound with a mixture of orthophosphoric acid and phosphorus pentoxide; heating the resultant reaction mixture with the addition of water; and finally treating the resultant mixture with an alkali metal hydroxide.

2. A process according to claim 1 wherein the 4-methyl-5-lower alkoxyoxazole used is 4-methyl-5-ethoxyoxazole.

3. A process according to claim 1 wherein the reaction of 4-methyl-5-lower alkoxyoxazole with 2,5-di-lower alkoxy-2,5-dihydrofuran is carried out in an atmosphere of inert gas at a temperature between 100 and 150° C.

4. A process according to claim 1 wherein the adduct is heated wtih an alkali metal hydroxide selected from the group consisting of sodium hydroxide and potassium hydroxide in a lower aliphatic alcohol at a temperature between 60 and 80° C. to give 1,3-dihydro-1,3-di-lower alkoxy-6-methylfuro[3,4-c]pyridine-7-ol.

5. A process according to claim 1 wherein the hydrolysis of 1,3-dihydro-1,3-di-lower alkoxy-6-methylfuro-[3,4-c]pyridin-7-ol is carried out in an aqueous solution of hydrochloric acid at a temperature between room temperature and 100° C.

6. A process according to claim 1 wherein the reaction of 2-methyl-3-hydroxypyridine-4,5-dicarboxaldehyde with a compound of the general formula:

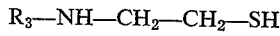

R₃—NH—CH₂—CH₂—SH is carried out in a solvent selected from the group consisting of water, methanol, ethanol and dioxane, at a temperature between room temperature and 100° C.

7. A process according to claim 1 wherein the reduction of a compound of the general formula:

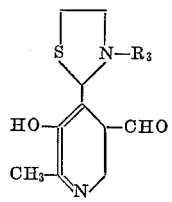

is carried out using a reducing agent selected from the group consisting of sodium borohydride, aluminum isopropoxide in isopropanol, and zinc powder in an aqueous acetic acid.

8. A process according to claim 1 wherein the phosphorylation of a compound of the general formula:

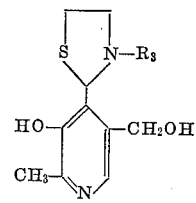

is carried out at a temperature between 40 and 80° C.

9. A process according to claim 1 wherein a mixture of unreacted starting materials of the first step is recovered and re-used after the complementary addition thereto of the fresh starting materials.

10. A process according to claim 1 followed by an isolation step of pyridoxal-5-phosphate which comprises adding an organic base selected from the group consisting of 4-aminoantipyrine and α-naphthylamine to the reaction mixture containing pyridoxal-5-phosphate to form the corresponding Schiff base; isolating the Schiff base; decomposing the Schiff base with an alkali metal hydroxide; removing the liberated organic base; and then recovering pyridoxal-5-phosphate from the resultant solution.

11. A compound of the formula:

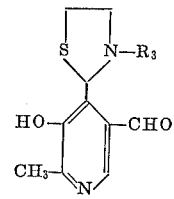

wherein R₃ represents a member selected from the group consisting of a cyclohexyl and benzyl group.

12. 2-(3 - hydroxy - 5 - formyl-2-methyl-4-pyridyl)-3-cyclohexylthiazolidine.

13. 2-(3-hydroxy - 5-formyl - 2 - methyl-4-pyridyl)-3-benzylthiazolidine.

14. A compound of the formula:

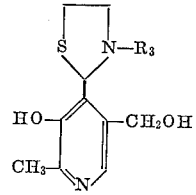

wherein R₃ represents a member selected from the group consisting of a cyclohexyl and benzyl group.

15. 2-(3-hydroxy - 5 - hydroxymethyl-2-methyl-4-pyridyl)-3-cyclohexylthiazolidine.

16. 2-(3-hydroxy - 5 - hydroxymethyl-2-methyl-4-pyridyl)-3-benzylthiazolidine.

References Cited
UNITED STATES PATENTS 3,124,587    3/1969    Schorre _____ 260—297.5

HENRY R. JILES, Primary Examiner

ALAN L. ROTMAN, Assistant Examiner

U.S. Cl. X.R.

260—297, 307, 347.8, 609, 999